US012633312B2

(12) United States Patent
Zhou

(10) Patent No.: US 12,633,312 B2
(45) Date of Patent: May 19, 2026

(54) METHOD FOR GENERATING FLAME VIDEO

(71) Applicant: NINGBO RICHEN ELECTRICAL APPLIANCE CO., LTD, Ningbo (CN)

(72) Inventor: Wei Zhou, Ningbo (CN)

(73) Assignee: Ningbo Richen Electrical Appliance Co., Ltd, Ningbo (CN)

( * ) Notice: Subject to any disclaimer, the term of this patent is extended or adjusted under 35 U.S.C. 154(b) by 0 days.

(21) Appl. No.: 18/945,421

(22) Filed: Nov. 12, 2024

(65) Prior Publication Data

US 2025/0157490 A1      May 15, 2025

(30) Foreign Application Priority Data

Nov. 13, 2023    (CN) .......................... 202311503889.0

(51) Int. Cl.
G11B 27/00          (2006.01)
G11B 27/10          (2006.01)
(52) U.S. Cl.
CPC .................................. G11B 27/007 (2013.01)
(58) Field of Classification Search
CPC ....... G11B 27/00; G11B 27/10; G11B 27/036; G11B 27/005

USPC .......................... 386/280, 278, 282, 239, 248
See application file for complete search history.

(56) References Cited

U.S. PATENT DOCUMENTS

| | | | | | |
|---|---|---|---|---|---|
| 9,473,757 | B2 * | 10/2016 | Clapper | ............... | H04N 9/8715 |
| 2013/0233841 | A1 * | 9/2013 | Gallo | ....................... | H04N 5/64 |
| | | | | | 219/201 |
| 2022/0068313 | A1 * | 3/2022 | Shafir Nir | .............. | G06V 20/48 |

* cited by examiner

*Primary Examiner* — Daquan Zhao
(74) *Attorney, Agent, or Firm* — Ferguson Case Orr Paterson

(57)          ABSTRACT

The present disclosure provides a method for generating a flame video, including the following step: repeating two or more sub-videos with burning flame images respectively to form corresponding sub-repeating videos, and overlapping the sub-repeating videos to form a total video. At a start time point and/or an end time point of any of the sub-videos in the total video, there exists at least one of the sub-videos that is at a certain time point between a start time point and an end time point. The certain time point between the start time point and the end time point is an intervening time point therebetween, excluding the start time point and the end time point.

10 Claims, 2 Drawing Sheets

Third sub-video          Second sub-video      First sub-video

Third sub-video          Second sub-video          First sub-video

Fourth sub-video
Third sub-video
Second sub-video
First sub-video

0          Cycle T          Time/t

METHOD FOR GENERATING FLAME VIDEO

RELATED APPLICATIONS

This application claims the benefit of Chinese Patent Application No. 202311503889.0, filed on Nov. 13, 2023, which is incorporated by reference as if fully set forth herein.

TECHNICAL FIELD

The present disclosure relates to the technical field of flame simulation, and in particular to a method for generating a flame video simulating burning flames by flame animation on an electric fireplace.

BACKGROUND

In addition to a heating function, an electric fireplace also has a good ornamental value as a decorative item. In recent years, with the ever-increasing popularity and technological maturity of audio and video players, there are now a lot of electric fireplaces that use display screens capable of playing audios and videos to play burning flame images, thereby simulating the scene of real burning flames, for example, patent application No. 202022549691.4, entitled "FLAME SIMULATION DEVICE WITH FLEXIBLE DISPLAY SCREEN".

However, as for simulating flames by playing flames on a display screen commonly used in the existing market, it usually loops a flame video, and an original video is generally obtained by filming. Thus, when a video ends and a next video starts, flame images are not seamless, and there will be a sudden change in the flame images. In addition, in order to reduce the frequency of sudden changes in the flame images, the cycle time of looping is usually increased. Then, the memory size of the flame video will be very large, and thus when reading a next video at the end of a video, the read access time will be longer, and even exceed the time of visual persistence. Therefore, when enjoy the electric fireplace, they will find image pauses in the flame images, which affects the visual effect. Besides, the flame video with a large size needs a memory with a large size, which increases the cost of the electric fireplace.

SUMMARY

In order to overcome the defects in the prior art, the present disclosure provides a method for generating a flame video, which can make simulated flames more realistic and consecutive, thus providing a good ornamental value for a user. Moreover, the size of the flame video can be made smaller, which reduces the size of a memory for storing the video and reduces the cost.

In order to achieve the above objective, the present disclosure adopts the following technical solution:

A method for generating a flame video includes the following step:

S1: repeating two or more sub-videos with burning flame images respectively to form corresponding sub-repeating videos, and overlapping the sub-repeating videos to form a total video, at a start time point and/or an end time point of any of the sub-videos in the total video, there existing at least one of the sub-videos that is at a certain time point between the start time point and the end time point. The certain time point between the start time point and the end time point is an intervening time point therebetween, excluding the start time point and the end time point.

In the process of repeating one of the sub-videos, there are sudden changes in the flame images of the sub-video at the start time point and the end time point. With the method above, during the repeating, when a sudden change appears in the flame images of one of the sub-videos, there will be at least one other sub-video that is at the intervening time point between the start time point and the end time point, i.e., the flame images are played consecutively. This greatly weakens the influence of the sudden change of the flame images of an individual sub-video on the overall flame images displayed by the total video, i.e., people are less likely to notice the sudden change in the flame images of an individual sub-video when enjoying the overall flame images displayed by the total video. Moreover, the visual effect is greatly improved.

The repeating may be understood as: after the playing of the sub-video ends, the sub-video is replayed immediately, or the sub-video is replayed after waiting for a period of time, and the waiting time between the sub-videos may be fixed or not fixed. For example, after the playing of a sub-video ends, the sub-video may be played immediately, or the sub-video may be replayed after waiting for a first duration; and after the playing of the sub-video ends again, the sub-video may be played immediately, or the sub-video may be replayed after waiting for a second duration, where the first duration and the second duration may or may not be equal, and this process is repeated.

The sudden change in the flame images may be understood as: during playing, when the video is switched from one frame to a next frame, there is a sudden big change rather than a successional small change in the content of the images.

The overlapping the sub-repeating videos to form the total video may be understood as: one of the sub-videos is played by one corresponding playing device, then the images played by the playing devices are overlapped to form the total video, where the playing devices are devices such as projectors and transparent screens; alternatively, each sub-video is repeated in software to obtain a sub-repeating video, the sub-repeating videos are then overlapped in software to obtain a playable total video, and the total video is played by the playing device.

Specifically, a control module includes a storage area and a control area. The storage area is configured to store the video displaying the flame images, and the control area is configured to control the video stored in the storage area to be played on the display device.

Further, in step S1, a play duration of each of the sub-videos is less than or equal to a duration T, and each of the sub-videos is looped and repeated with a cycle of the duration T to form the corresponding sub-repeating video; and in the total video, at least part of the sub-videos do not coincide with other different sub-videos in the start time point and the end time point.

With the method above, the play duration of each of the sub-videos is less than or equal to the duration T, and each of the sub-videos is looped and repeated with the cycle of the duration T to form the corresponding sub-repeating video, so that all the sub-repeating videos are played regularly. Accordingly, during the overlapping, it is easier to realize and maintain that in the total video, at least part of the sub-videos do not coincide with other different sub-videos in the start time point and the end time point.

In the total video, due to the fact that at least part of the sub-videos do not coincide with other different sub-videos in the start time point and the end time point, at the start time point and the end time point of any of the sub-videos in the total video, there exists at least one of the sub-videos that is at a certain time point between the start time point and the end time point, excluding the start time point and the end time point.

The looping and repeating may be understood as: after the playing of a sub-video ends, the sub-video is replayed immediately, and this process is repeated; alternatively, after the playing of a sub-video ends, the sub-video is replayed after waiting for a period of time, and the waiting time between the sub-video and the sub-video is fixed. That is, after the playing of the sub-video ends, the sub-video is replayed after waiting for a first duration, and after the playing of the sub-video ends again, the sub-video is replayed after waiting for a second duration, where the first duration and the second duration are equal, and this process is repeated. Of course, the waiting time may be filled with other same videos or part of the sub-video.

Further, in step S1, when the play duration of the sub-video is equal to the duration T, a next same sub-video is played immediately after the playing of a sub-video ends to form a loop and repetition; and when the play duration of the sub-video is less than the duration T, a next same sub-video is played after a waiting duration after the playing of a sub-video ends, the waiting duration being equal to a difference between the duration T and the play duration of the sub-video.

Since the sub-videos have different durations, with the method above, the sub-video can be looped and repeated with the cycle of the duration T to form the sub-repeating video according to the play duration of the sub-video.

Further, the method for controlling playing of the flame video further includes the following steps:

S2: capturing, from the total video formed in step S1, a video with a time span of the duration T as a play video; and S3: looping the play video obtained in step S2 with the cycle of the duration T.

In some embodiments, the total video is formed from the sub-videos in software, and finally stored and played. Since the sub-videos are each looped and repeated with the cycle of the duration T, the total video is also a looping video with the cycle of the duration T. With the method above, the video is captured from the total video with the time span of the duration T as the play video, and finally, the play video is looped with the cycle of the duration T, so that the total video can be played.

From the perspective of storage, it is only required to store the play video captured from the total video with the time span of the duration T, which can greatly reduce the storage space. From the perspective of playing and reading, since the play video is small in size, it is quick to read the play video, and there is no image pause, which improves the ornamental value of the flame video.

The image pause may be understood as: when the playing of a video ends and the control module reads a next video, the image is still; and at this time, the image may stay at the last frame of the previous video or there may be no image displayed.

Further, brightness processing is performed on each of the sub-videos such that a brightness of each of the sub-videos changes from low to high at a start and from high to low at an end; and each of the sub-videos is looped after the brightness processing.

With the method above, performing brightness processing on each of the sub-videos can weaken the sudden changes in the flame images at the start time point and the end time point of each sub-video, which greatly improves the ornamental value of the overall flame images.

Further, flames displayed by flame images played in the sub-videos complement each other in space.

With the method above, the overall flame images are more harmonious, consecutive and realistic.

"Flames displayed by the flame images played in the sub-videos complement each other in space" may be understood as: in a certain frame of the overall flame image at a certain time point, the flames displayed by the flame images played in all the sub-videos can complement each other in the overlapped overall flame image in a width direction and/or a depth direction. That is, as there is a certain distance between the flames in the flame image played in a sub-video, the flame in the flame image played in one or more other sub-videos will be located at the position between the flames in the flame image played in the sub-video above, thereby realizing complementation. The flames in the flame images played in different sub-videos are overlapped front and back, thereby realizing complementation in the depth direction.

Further, at any time point, a proportion of a flame displayed by a flame image played in any of the sub-videos to the flames displayed by a flame image played in the total video does not exceed a flame proportion upper limit.

Specifically, the flame proportion upper limit is 40%.

With the method above, the upper limit of the proportion of the flame displayed by the flame image played in the sub-video to the flames displayed by the flame images played in the total video is defined, which makes the overall flame images more harmonious, consecutive and realistic and can weakens the influence of the sudden change of the flame images of an individual sub-video on the overall flame images displayed by the total video, i.e., people are less likely to notice the sudden change in the flame images of an individual sub-video when enjoying the overall flame images displayed by the total video. Moreover, the visual effect is greatly improved.

Further, at any time point, the total video has at least two of the sub-videos played simultaneously.

With the method above, at the start time point and/or the end time point of any of the sub-videos in the total video, there exist at least one of the sub-videos that is at a certain time point between the start time point and the end time point; and moreover, the flame images displayed by the total video can be more harmonious, consecutive and realistic at any time point.

Further, a number of the sub-videos is three or more.

With the method above, the flame images displayed by the total video can be more harmonious, consecutive and realistic.

Further, the duration T ranges from 1 min to 60 min, including the endpoints.

With the method above, the duration T is defined, i.e., the size of the play video is defined, so that the size of the play video will not be too large, which can greatly increase the speed for reading the play video. Due to the visual persistence, when the playing of the play video ends and a play video to be played in a next cycle is being read, the flame images at the start and the end of the video are visually consecutive, and there will no image pauses in the play video due to the excessive reading time during looping.

Further, the duration T is 10 min.

The shorter the duration T, the smaller the size of the play video, and the higher the speed for reading the play video, but the flame video displayed by the play video will be too monotonous and simple, which lowers the ornamental value. On the contrary, the longer the duration T, the more gorgeous and realistic the flame video displayed by the play video, but the size of the play video and the cost for storage will be increased, and there will be image pauses visually at the start and the end of the video.

With the method above, the use of 10 min as the duration is one of the optimal solutions under the consideration of both the size of the play video and the richness of the flame video displayed by the play video.

Compared with the prior art, the present disclosure has the following beneficial effects:

(1) According to the method for generating a flame video in the present disclosure, the plurality of sub-videos are repeated and overlapped. In this way, during the repeating, when a sudden change appears in the flame images of one of the sub-videos, there will be at least one other sub-video that is at the intervening time point between the start time point and the end time point, i.e., the flame images are played consecutively. This greatly weakens the influence of the sudden change of the flame images of an individual sub-video on the overall flame images displayed by the total video, i.e., people are less likely to notice the sudden change in the flame images of an individual sub-video when enjoying the overall flame images displayed by the total video. Moreover, the visual effect is greatly improved.

(2) With the method above for generating a flame video in the present disclosure, it is only required to store the play video with the play duration T, so the size of the play video can be made smaller, which greatly reduces the size of a memory for storing the video and reduces the cost. Moreover, this can avoid image pauses due to the excessively low speed for reading the play video.

(3) The method for generating a flame video in the present disclosure is reasonable in design.

BRIEF DESCRIPTION OF FIGURES

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DETAILED DESCRIPTION

Figure 1:
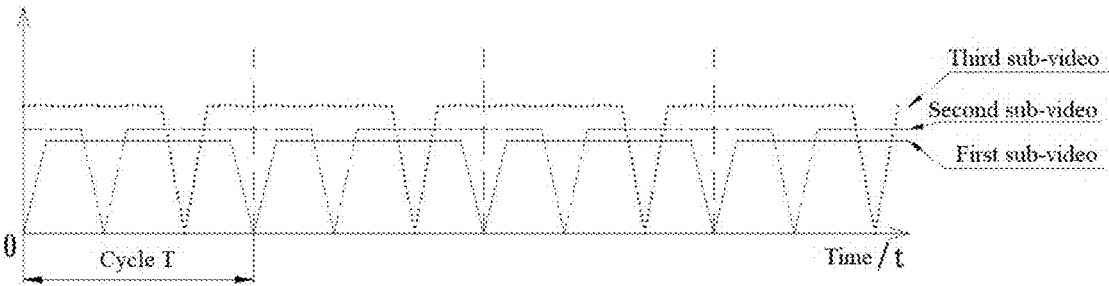
FIG. 1 is a schematic diagram showing brightness of sub-videos overlapped in time according to a method for generating a flame video in Embodiment 1 of the present disclosure.

This application will be described in detail below in conjunction with accompanying drawings and specific embodiments.

The implementations of the present disclosure will be described below with reference to specific examples. Those skilled in the art may easily understand other advantages and effects of the present disclosure by the contents disclosed in the present specification. Apparently, the described embodiments are merely a part of embodiments of the disclosure and are not all the embodiments. The present disclosure may also be implemented or applied through other different specific implementations. Various modifications or changes may also be made on the details in the present specification without departing from the spirit of the present disclosure based on different viewpoints and applications. It should be noted that in the absence of conflicts, the following embodiments and features in the embodiments may be combined mutually. All other embodiments obtained by those of ordinary skill in the art based on the embodiments of this application without making creative efforts shall fall within the protection scope of this application.

It is noted that various aspects of the embodiments within the scope of the appended claims are described below. It is apparent that the aspects described herein can be embodied in a wide variety of forms, and any specific structure and/or function described herein is merely illustrative. Based on this application, those skilled in the art should understand that one aspect described herein may be implemented independently of any other aspect, and two or more of these aspects may be combined in various ways. For example, equipment and/or methods may be implemented using any number of aspects described herein. In addition, the equipment and/or the method may be implemented using other structures and/or functionalities than one or more of the aspects described herein.

It should also be noted that the drawings provided in the following embodiments only illustrate the basic concept of this application in a schematic way.

In addition, in the following description, specific details are provided to facilitate a thorough understanding of the examples. However, it will be understood by those skilled in the art that the present disclosure may be implemented without these specific details.

The technical solutions provided by the embodiments of this application will be described below with reference to the accompanying drawings.

Embodiment 1

Referring to FIG. 1 to FIG. 4, a method for generating a flame video includes the following step:

S1: Repeat two or more sub-videos with burning flame images respectively to form corresponding sub-repeating videos, and overlap the sub-repeating videos to form a total video. At a start time point and/or an end time point of any of the sub-videos in the total video, there exists at least one of the sub-videos that is at a certain time point between a start time point and an end time point. The certain time point between the start time point and the end time point is an intervening time point therebetween, excluding the start time point and the end time point.

Specifically, in this embodiment, there are three sub-videos, namely a first sub-video, a second sub-video and a third sub-video.

Figure 3:
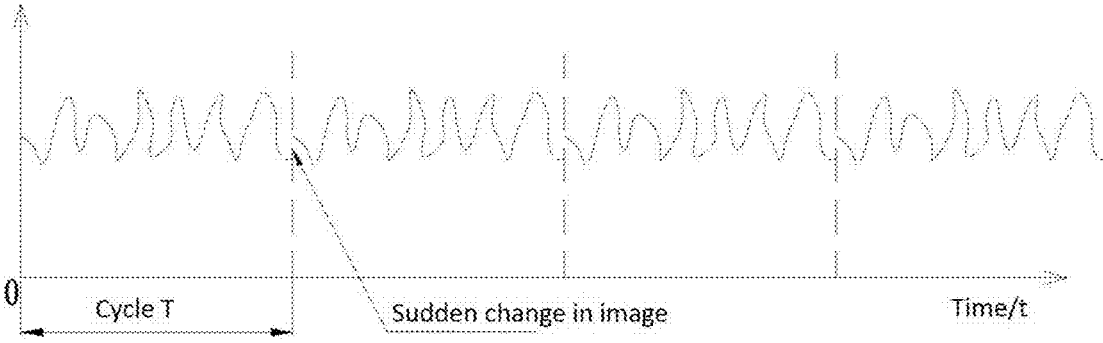
FIG. 3 is a schematic diagram showing morphology of a flame displayed by a single sub-video in time With the method above for generating a flame video in Embodiment 1 of the present disclosure.

As shown in FIG. 3, in the process of repeating one of the sub-videos, there are sudden changes in the flame images of the sub-video at the start time point and the end time point.

With the method above, during the repeating, when a sudden change appears in the flame images of one of the sub-videos, there will be at least one other sub-video that is at the intervening time point between the start time point and the end time point, i.e., the flame images are played consecutively. This greatly weakens the influence of the sudden change of the flame images of an individual sub-video on the overall flame images displayed by the total video, i.e., people are less likely to notice the sudden change in the flame images of an individual sub-video when enjoying the overall flame images displayed by the total video. Moreover, the visual effect is greatly improved.

The repeating may be understood as: after the playing of the sub-video ends, the sub-video is replayed immediately, or the sub-video is replayed after waiting for a period of time, and the waiting time between the sub-video and the sub-video may be fixed or not fixed. For example, after the playing of the sub-video ends, the sub-video may be played immediately, or the sub-video may be replayed after waiting for a first duration; and after the playing of the sub-video ends again, the sub-video may be played immediately, or the sub-video may be replayed after waiting for a second duration, where the first duration and the second duration may or may not be equal, and this process is repeated.

The sudden change in the flame images may be understood as: during playing, when the video is switched from one frame to a next frame, there is a sudden big change rather than a successional small change in the content of the images.

The overlapping the sub-repeating videos to form the total video may be understood as: one sub-video is played by one corresponding playing device, then the images played by the playing devices are overlapped to form the total video, where the playing devices are devices such as projectors and transparent screens; alternatively, each sub-video is repeated in software to obtain a sub-repeating video, the sub-repeating videos are overlapped in software to obtain a playable total video, and the total video is played by the playing device.

Specifically, a control module includes a storage area and a control area. The storage area is configured to store the video displaying the flame images, and the control area is configured to control the video stored in the storage area to be played on the display device.

In this embodiment, in step S1, a play duration of each of the sub-videos is equal to a duration T, and each of the sub-videos is looped and repeated with a cycle of the duration T to form the corresponding sub-repeating video; and in the total video, at least part of the sub-videos do not coincide with other different sub-videos in the start time point and the end time point.

With the method above, the play duration of each of the sub-videos is equal to the duration T, and each of the sub-videos is looped and repeated with the cycle of the duration T to form the corresponding sub-repeating video, so that all the sub-repeating videos are played regularly. Accordingly, during the overlapping, it is easier to realize and maintain that in the total video, at least part of the sub-videos do not coincide with other different sub-videos in the start time point and the end time point.

In the total video, due to the fact that at least part of the sub-videos do not coincide with other different sub-videos in the start time point and the end time point, at the start time point and the end time point of any of the sub-videos in the total video, there exists at least one of the sub-videos that is at a certain time point between the start time point and the end time point, excluding the start time point and the end time point.

The looping and repeating may be understood as: after the playing of a sub-video ends, the sub-video is replayed immediately, and this process is repeated; alternatively, after the playing of the sub-video ends, the sub-video is replayed after waiting for a period of time, and the waiting time between the sub-video and the sub-video is fixed. That is, after the playing of the sub-video ends, the sub-video is replayed after waiting for a first duration, and after the playing of the sub-video ends again, the sub-video is replayed after waiting for a second duration, where the first duration and the second duration are equal, and this process is repeated. Of course, the waiting time may be filled with other same videos or part of the sub-video.

In this embodiment, in step S1, since the play duration of the sub-video is equal to the duration T, the next same sub-video is played immediately after the playing of the previous sub-video ends to form a loop and repetition.

With the method above, the sub-video can be looped and repeated with the cycle of the duration T to form the sub-repeating video.

Figure 2:
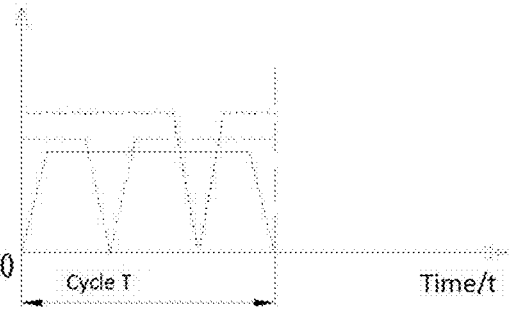
FIG. 2 is a schematic diagram of brightness of a play video in one cycle With the method above for generating a flame video in Embodiment 1 of the present disclosure.

As shown in FIG. 1 and FIG. 2, in this embodiment, the method for controlling playing of the flame video further includes the following steps:

S2: Capture, from the total video formed in step S1, a video with a time span of the duration T as a play video.

S3: Loop the play video obtained in step S2 with the cycle of the duration T.

In some embodiments, the total video is formed from the sub-videos, and finally stored and played in software. Since the sub-videos are each looped and repeated with the cycle of the duration T, the total video is also a looping video with the cycle of the duration T. With the method above, the video is captured from the total video with the time span of the duration T as the play video, and finally, the play video is looped with the cycle of the duration T, so that the total video can be played.

From the perspective of storage, it is only required to store the play video captured from the total video with the time span of the duration T, which can greatly reduce the storage space. From the perspective of playing and reading, since the play video is small in size, it is quick to read the play video, and there is no image pause, which improves the ornamental value of the flame video.

The image pause may be understood as: when the playing of a video ends and the control module reads a next video, the image is still; and at this time, the image may stay at the last frame of the previous video or there may be no image displayed.

As shown in FIG. 1, in this embodiment, brightness processing is performed on each of the sub-videos such that a brightness of each of the sub-videos changes from low to high at a start and from high to low at an end; and each of the sub-videos is looped after the brightness processing.

With the method above, performing brightness processing on each of the sub-videos can weaken the sudden changes in the flame images at the start time point and the end time point of each sub-video, which greatly improves the ornamental value of the overall flame images.

Figure 4:
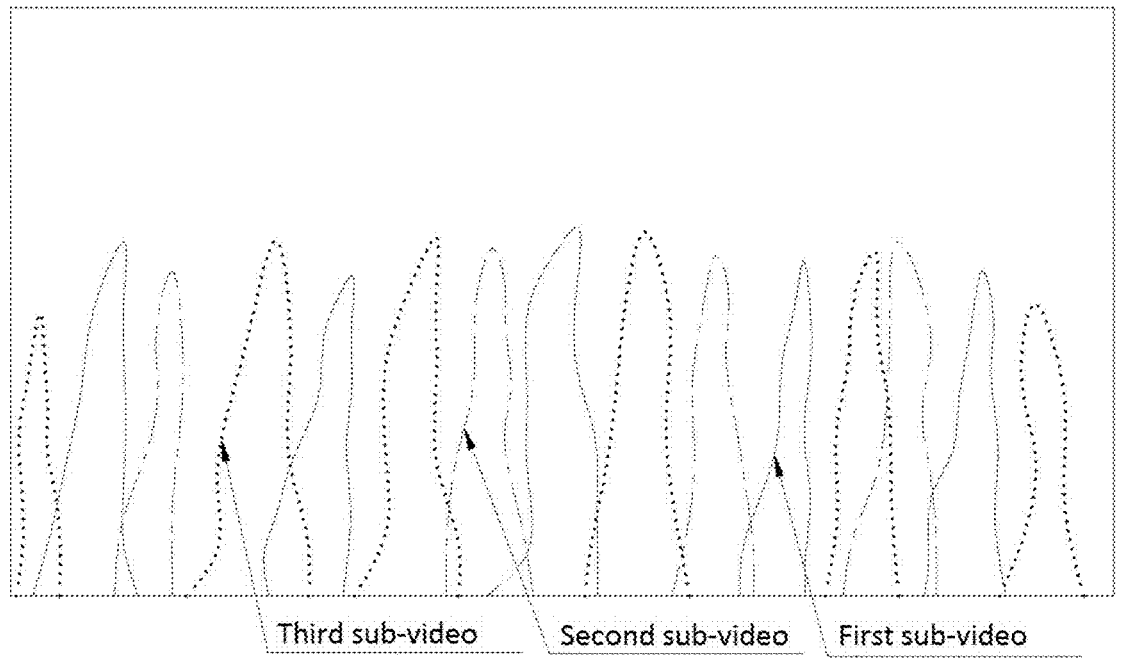
FIG. 4 is a schematic diagram showing the sub-videos complementing each other in space With the method above for generating a flame video in Embodiment 1 of the present disclosure.

As shown in FIG. 4, in this embodiment, flames displayed by flame images played in the sub-videos complement each other in space.

With the method above, the overall flame images are more harmonious, consecutive and realistic.

"Flames displayed by flame images played in the sub-videos complement each other in space" may be understood as: in a certain frame of the overall flame image at a certain time point, the flames displayed by the flame images played in all the sub-videos can complement each other in the overlapped overall flame image in the width direction and/or the depth direction; that is, as there is a certain distance between the flames in the flame image played in a certain sub-video, the flame in the flame image played in one or more other sub-videos will be located at the position between the flames in the flame image played in the above sub-video, thereby realizing complementation; and the flames in the flame images played in different sub-videos are overlapped front and back, thereby realizing complementation in the depth direction.

In this embodiment, at any time point, a proportion of a flame displayed by a flame image played in any of the sub-videos to the flames displayed by a flame image played in the total video does not exceed a flame proportion upper limit.

Specifically, the flame proportion upper limit is 40%.

With the method above, the upper limit of the proportion of the flame displayed by the flame image played in the sub-video to the flames displayed by the flame images played in the total video is defined, which makes the overall flame images more harmonious, consecutive and realistic and can weakens the influence of the sudden change of the flame images of an individual sub-video on the overall flame images displayed by the total video, i.e., people are less likely to notice the sudden change in the flame images of an individual sub-video when enjoying the overall flame images displayed by the total video. Moreover, the visual effect is greatly improved.

In this embodiment, at any time point, the total video has at least two of the sub-videos played simultaneously.

With the method above, at the start time point and/or the end time point of any of the sub-videos in the total video, there exist at least one of the sub-videos that is at a certain time point between the start time point and the end time point; and moreover, the flame images displayed by the total video can be more harmonious, consecutive and realistic at any time point.

In this embodiment, a number of the sub-videos is three or more.

With the method above, the flame images displayed by the total video can be more harmonious, consecutive and realistic.

In this embodiment, the duration T ranges from 1 min to 60 min, including the endpoints.

With the method above, the duration T is defined, i.e., the size of the play video is defined, so that the size of the play video will not be too large, which can greatly increase the speed for reading the play video. Due to the visual persistence, when the playing of the play video ends and a play video to be played in a next cycle is being read, the flame images at the start and the end of the video are visually consecutive, and there will no image pauses in the play video due to the excessive reading time during looping.

In this embodiment, the duration T is 10 min.

The shorter the duration T, the smaller the size of the play video, and the higher the speed for reading the play video, but the flame video displayed by the play video will be too monotonous and simple, which lowers the ornamental value. On the contrary, the longer the duration T, the more gorgeous and realistic the flame video displayed by the play video, but the size of the play video and the cost for storage will be increased.

With the method above, the use of 10 min as the duration is one of the optimal solutions under the consideration of both the size of the play video and the richness of the flame video displayed by the play video.

Embodiment 2

Figure 5:
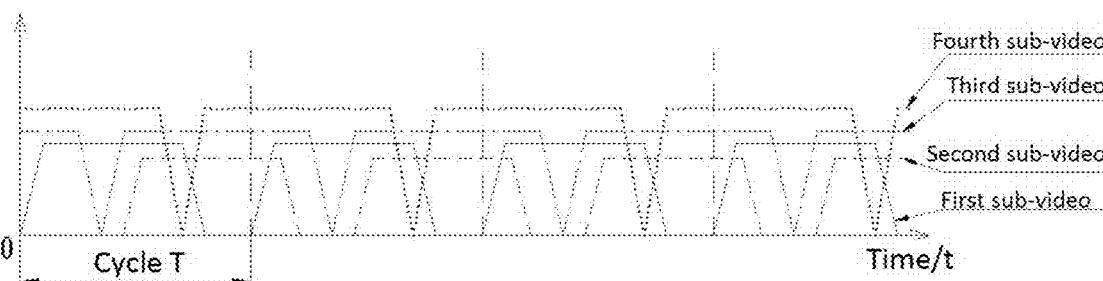
FIG. 5 is a schematic diagram showing brightness of sub-videos overlapped in time With the method above for generating a flame video in Embodiment 2 of the present disclosure.

Referring to FIG. 5, this embodiment is different from Embodiment 1 in that:

in this embodiment, there are four sub-videos, namely a first sub-video, a second sub-video, a third sub-video and a fourth sub-video.

In this embodiment, in step S1, a play duration of each of the sub-videos is less than or equal to a duration T, and each of the sub-videos is looped and repeated with a cycle of the duration T to form the corresponding sub-repeating video; and in the total video, at least part of the sub-videos do not coincide with other different sub-videos in the start time point and the end time point.

With the method above, the play duration of each of the sub-videos is less than or equal to the duration T, and each of the sub-videos is looped and repeated with the cycle of the duration T to form the corresponding sub-repeating video, so that all the sub-repeating videos are played regularly. Accordingly, during the overlapping, it is easier to realize and maintain that in the total video, at least part of the sub-videos do not coincide with other different sub-videos in the start time point and the end time point.

In the total video, due to the fact that at least part of the sub-videos do not coincide with other different sub-videos in the start time point and the end time point, at the start time point and the end time point of any of the sub-videos in the total video, there exists at least one of the sub-videos that is at a certain time point between the start time point and the end time point, excluding the start time point and the end time point.

The looping and repeating may be understood as: after the playing of a sub-video ends, the sub-video is replayed immediately, and this process is repeated; alternatively, after the playing of the sub-video ends, the sub-video is replayed after waiting for a period of time, and the waiting time between the sub-video and the sub-video is fixed. That is, after the playing of the sub-video ends, the sub-video is replayed after waiting for a first duration, and after the playing of the sub-video ends again, the sub-video is replayed after waiting for a second duration, where the first duration and the second duration are equal, and this process is repeated. Of course, the waiting time may be filled with other same videos or part of the sub-video.

Specifically, in this embodiment, the play duration of the first sub-video is less than the duration T, and the play durations of the second sub-video, the third sub-video and the fourth sub-video are respectively equal to the duration T.

In this embodiment, in step S1, when the play duration of the sub-video is equal to the duration T, a next same sub-video is played immediately after the playing of a sub-video ends to form a loop and repetition.

When the play duration of the sub-video is less than the duration T, a next same sub-video is played after a waiting duration after the playing of a sub-video ends, the waiting duration being equal to a difference between the duration T and the play duration of the sub-video.

Since the sub-videos have different durations, with the method above, the sub-video can be looped and repeated with the cycle of the duration T to form the sub-repeating video according to the play duration of the sub-video.

For the same or similar parts between the embodiments in the specification, reference may be made to each other. Each embodiment focuses on differences from other embodiments.

The foregoing descriptions are merely specific embodiments of the present application, but the protection scope of the present application is not limited thereto. Any changes or replacements within the technical scope disclosed in the present application made by those skilled in the art should fall within the scope of protection of the present application. Therefore, the scope of protection of this application shall take the scope of protection of the claims as final.

What is claimed is:

1. A method for generating a flame video, comprising the following step:

S1: repeating two or more sub-videos with burning flame images respectively to form corresponding sub-repeating videos, and overlapping the sub-repeating videos to form a total video, at a start time point and/or an end time point of any of the sub-videos in the total video, there existing at least one of the sub-videos that is at an intervening time point between and excluding the start time point and the end time point.

2. The method for generating a flame video according to claim 1, wherein in step S1, a play duration of each of the sub-videos is less than or equal to a duration T, and each of the sub-videos is looped and repeated with a cycle of the duration T to form the corresponding sub-repeating video; and in the total video, at least part of the sub-videos do not coincide with other different sub-videos in the start time point and the end time point.

3. The method for generating a flame video according to claim 2, further comprising the following steps:

S2: capturing, from the total video formed in step S1, a video with a time span of the duration T as a play video; and S3: looping the play video obtained in step S2 with the cycle of the duration T.

4. The method for generating a flame video according to claim 2, wherein in step S1, when the play duration of the sub-video is equal to the duration T, a next same sub-video is played immediately after the playing of a sub-video ends to form a loop and repetition; and when the play duration of the sub-video is less than the duration T, a next same sub-video is played after a waiting duration after the playing of a sub-video ends, the waiting duration being equal to a difference between the duration T and the play duration of the sub-video.

5. The method for generating a flame video according to claim 1, wherein brightness processing is performed on each of the sub-videos such that a brightness of each of the sub-videos changes from low to high at a start and from high to low at an end; and each of the sub-videos is looped after the brightness processing.

6. The method for generating a flame video according to claim 1, wherein flames displayed by flame images played in the sub-videos complement each other in space.

7. The method for generating a flame video according to claim 1, wherein at any time point, a proportion of a flame displayed by a flame image played in any of the sub-videos to flames displayed by flame images played in the total video does not exceed a flame proportion upper limit; and the flame proportion upper limit is 40%.

8. The method for generating a flame video according to claim 1, wherein at any time point, the total video has at least two of the sub-videos played simultaneously.

9. The method for generating a flame video according to any one of claims 2 to 8, wherein a number of the sub-videos is three or more.

10. The method for generating a flame video according to any one of claims 2 to 8, wherein the duration T ranges from 1 min to 60 min.

* * * * *